April 28, 1953      F. J. DEMMER, SR      2,636,308
PORTABLE LIVE BAIT CARRIER AND PRESERVER
Filed July 29, 1948
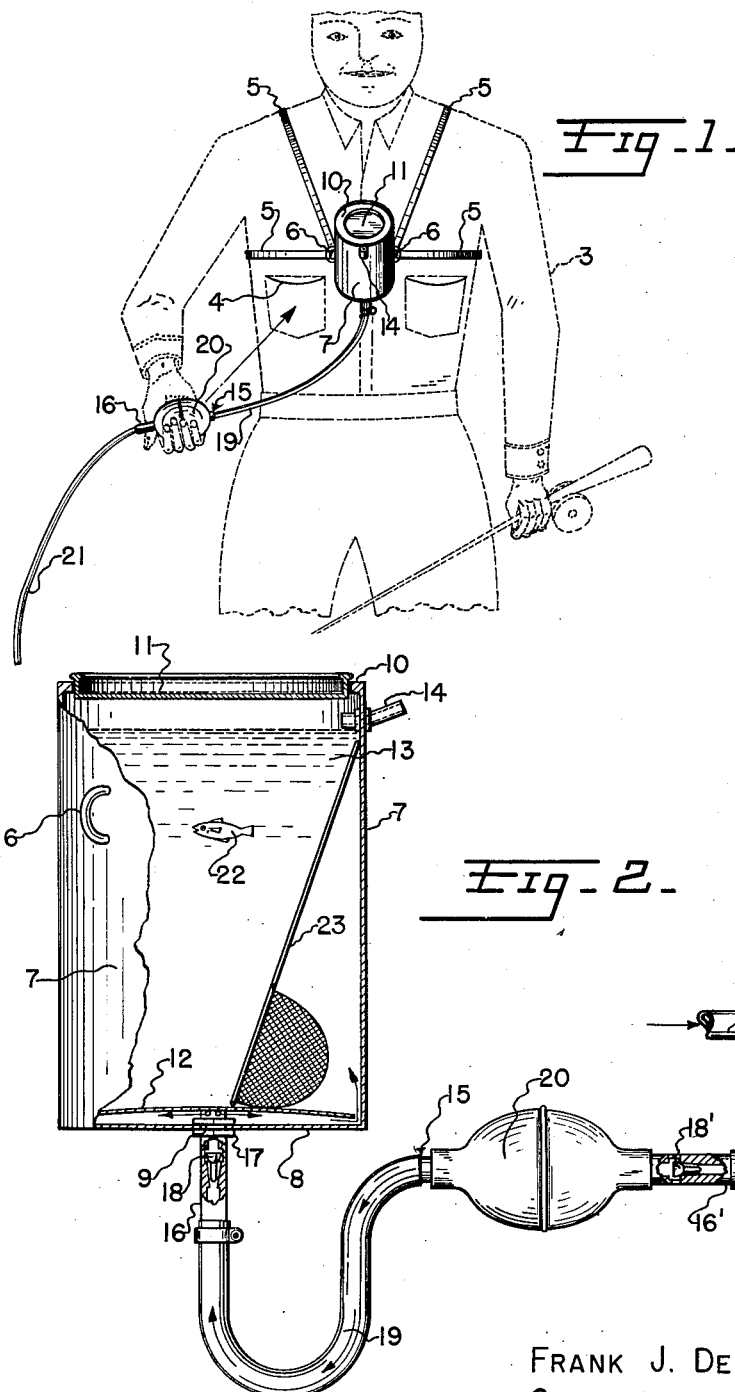
Inventor
FRANK J. DEMMER, SR.
By Harvey & O'Connell
attorneys.

Patented Apr. 28, 1953

2,636,308

UNITED STATES PATENT OFFICE 2,636,308

PORTABLE LIVE BAIT CARRIER AND PRESERVER

Frank J. Demmer, Sr., Johnstown, Pa.

Application July 29, 1948, Serial No. 41,257

1 Claim. (Cl. 43—57)

The present invention comprises a portable live bait carrier and preserver pendently carried by and supported in accessible position to the fisherman to the end that live bait may be constantly maintained in a live natural state and may be removed with facility without appreciable delay or interruption.

Experiments have proven that with this invention the legal possession limit of thirty-five bait fish can be kept normal and active for at least nine hours with obvious beneficial results in fishing, in addition to which the bait not used may be returned to open water for future use.

This invention contemplates the use of a small receptacle, capable of holding approximately a pint of water, which may be supported from the shoulders of the user and is equipped with simple suction means for periodic introduction of water or air into the receptacle, the latter having an overflow vent near its top.

It is, of course, known in the art to provide live bait receptacles with aerators for replenishing the oxygen content of the water and these have been found useful for transporting live bait in the so-called "minnow buckets" because of the large water content. With a small receptacle the bait cannot be kept alive unless the water is changed at very frequent intervals. With the present invention the water in the small bait receptacle may be aerated while being transported to the fishing ground and the aerating means also used for introducing fresh water from the waters fished in while the fisherman is standing in the fishing waters or located on the bank adjacent said waters.

It is also an object of this invention to provide a portable live bait carrier and preserver which includes a receptacle with communicating suction means and a body encircling support made up in a compact unit which is carried in its entirety by the user without inconvenience either during transportation or while fishing.

Other objects of the invention will be apparent from the following description of the present preferred form of the invention taken in connection with the accompanying drawings wherein:

Figure 1 is a perspective view of a portable live bait carrier and preserver unit constructed in accordance with the present invention illustrating its application; and Figure 2 is a fragmentary elevational view of the receptacle and suction means of the present invention, the bait dipper being shown in the receptacle in elevation.

In order to illustrate the application of this invention the outline of the human figure has been fragmentarily shown in dotted lines, as indicated at 3, the upper part of the body of which is covered with a shirt or jacket which is provided with a pocket 4.

The unit of the present invention includes body encircling harness 5 of any desired construction but preferably pending from the shoulders and equipped with suitable attaching elements adapted for engagement with complemental supporting means 6 mounted on the outer periphery of a bait and water-carrying receptacle 7. Preferably the receptacle 7 is cylindrical in shape and its capacity is approximately one pint. The bottom of the receptacle is closed, as indicated at 8, except for an opening formed centrally therein, as indicated at 9, through which water and air may be introduced in a manner hereinafter set forth. The top of the receptacle is open and its margin preferably thickened to provide an annular ring 10 which complements and is adapted for snug engagement with a lid or closure 11.

Mounted in the receptacle above the opening 9 and in spaced relation to the bottom of the receptacle and also in spaced relation to the receptacle walls is a distributor 12. The distributor may consist of a plate or disc which is preferably dished with the concave face turned downwardly, as advantageously illustrated in Figure 2. The distributor is imperforate, consequently water or air forced through the opening 9 in the bottom of the receptacle is compelled to travel beneath the distributor and around the periphery of the latter, as shown by the arrows in Figure 2.

Normally the receptacle 7 carries water 13 in which the live bait 22 is immersed. The level of the water is determined by an overflow pipe 14, mounted in a receptacle wall in close proximity to the flange 10. The outer end of the pipe 14 extends appreciably beyond the outer periphery of the receptacle and may be bent upwardly, as shown in Figure 2, to reduce the possibility of the vented water coming in contact with the fisherman.

Placed in communication with the opening 9 at the bottom of the receptacle is a pressure means, generally designated 15, which in the present instance comprises a valved nipple 16 detachably secured by nuts 17 to the bottom of the receptacle. The nipple is provided with a bore and valve seat which latter is adapted for the reception of a valve 18. The lower end of the nipple is embraced by one end of a flexible tube 19, the opposite end of the latter being engaged with one end of a suction bulb 20. The opposite end of the suction bulb carries a valved nipple 16' in which a valve 18' is movably mounted. The outer end of the nipple is engaged by one end of a flexible tube 21 which may be of any desired length.

For convenience in removing the live bait 22 from the receptacle 7, I employ a perforate dipper 23. The dipper may be transported in the receptacle substantially in the position as shown in Figure 2 of the drawing.

In use of this invention the receptacle is filled with fresh water and the live bait deposited. The legal possession limit of bait will remain alive in the amount of water carried in a receptacle of approximately one pint size for about a half hour. When the receptacle is being transported to the fishing ground, supplemental air may be added by operation of the suction bulb 20 in an apparent manner. It is preferred, however, to freshen the water frequently. While fishing, this is done by dipping the inlet end of the tube 21 into the fishing waters and operating the suction bulb 20. As is believed to be apparent from a consideration of Figure 2 of the drawings, after water is drawn into the bulb 20, the valve 18' closes. Consequently when the bulb 20 is again compressed, the water forces the valve 18 open and the water is forced through the opening 9 at the bottom of the receptacle and around the margins of the distributor 12 upwardly into the receptacle. This displaces water through the vent 14 at the top of the receptacle. By following this practice, it has been found that the live bait may be maintained in a normal active state for many hours. This is not possible by aerating the water unless a very large receptacle with a correspondingly large water content is employed.

As stated above, the device of the present invention is not cumbersome and may be carried without inconvenience by the fisherman. Even the bulb 20 and its associated tubes 19 and 21 are of a size to permit their being conveniently deposited in the pocket 4 of the fisherman's shirt or jacket when the bulb and tubes are not actually in use. Actual experience has proven that with the device of the present invention the receptacle may be filled with water to the desired height within a period of not less than 50 seconds and with approximately seven compressions of the bulb 20. The bait is consequently kept in fresh water of the desired temperature all during the fishing operation.

It is, of course, to be understood that various changes may be made in this invention within the scope of the claim hereto appended.

I claim:

The combination of a bait container, a harness secured thereto for supporting the bait container on the body of a person between his arms, said bait container having a bottom provided with an opening therein, and a pump comprising flexible tubes, one of said tubes being in communication with the opening, and another of said tubes adapted to receive water or air, a pressure bulb intermediate and in communication with said tubes and secured thereto, said pressure bulb being at such distance from the container that the person having the container in said position thereon can manipulate the bulb with one of the hands of said arms while so held, and a valve in each of said tubes whereby the bait container may receive the fluid passing through said tubes.

FRANK J. DEMMER, Sr.

References Cited in the file of this patent

UNITED STATES PATENTS

| Number | Name | Date |
| --- | --- | --- |
| Re. 11,430 | Vanorman | July 10, 1894 |
| 180,085 | Wilmot | July 18, 1876 |
| 299,765 | Evans | June 3, 1884 |
| 511,790 | Nickerson | Jan. 2, 1894 |
| 867,112 | Connor | Sept. 24, 1907 |
| 1,054,561 | Kennedy | Feb. 25, 1913 |
| 1,076,542 | Balch | Oct. 21, 1913 |
| 1,407,258 | Connors | Feb. 21, 1922 |
| 1,588,040 | Moore | June 8, 1926 |
| 1,604,971 | Churchill et al. | Nov. 2, 1926 |
| 2,123,932 | Carriveau | July 19, 1938 |

FOREIGN PATENTS

| Number | Country | Date |
| --- | --- | --- |
| 26,428 | Great Britain | A. D. 1909 |